Nov. 29, 1966  J. L. SWICKARD, JR., ETAL  3,287,764
PLASTIC PELLETIZERS
Filed June 1, 1965  2 Sheets-Sheet 1

INVENTORS
JAMES L. SWICKARD, JR. &
BY  HARVEY H. GOVE

Marechal, Biebel, French & Bugg
ATTORNEYS

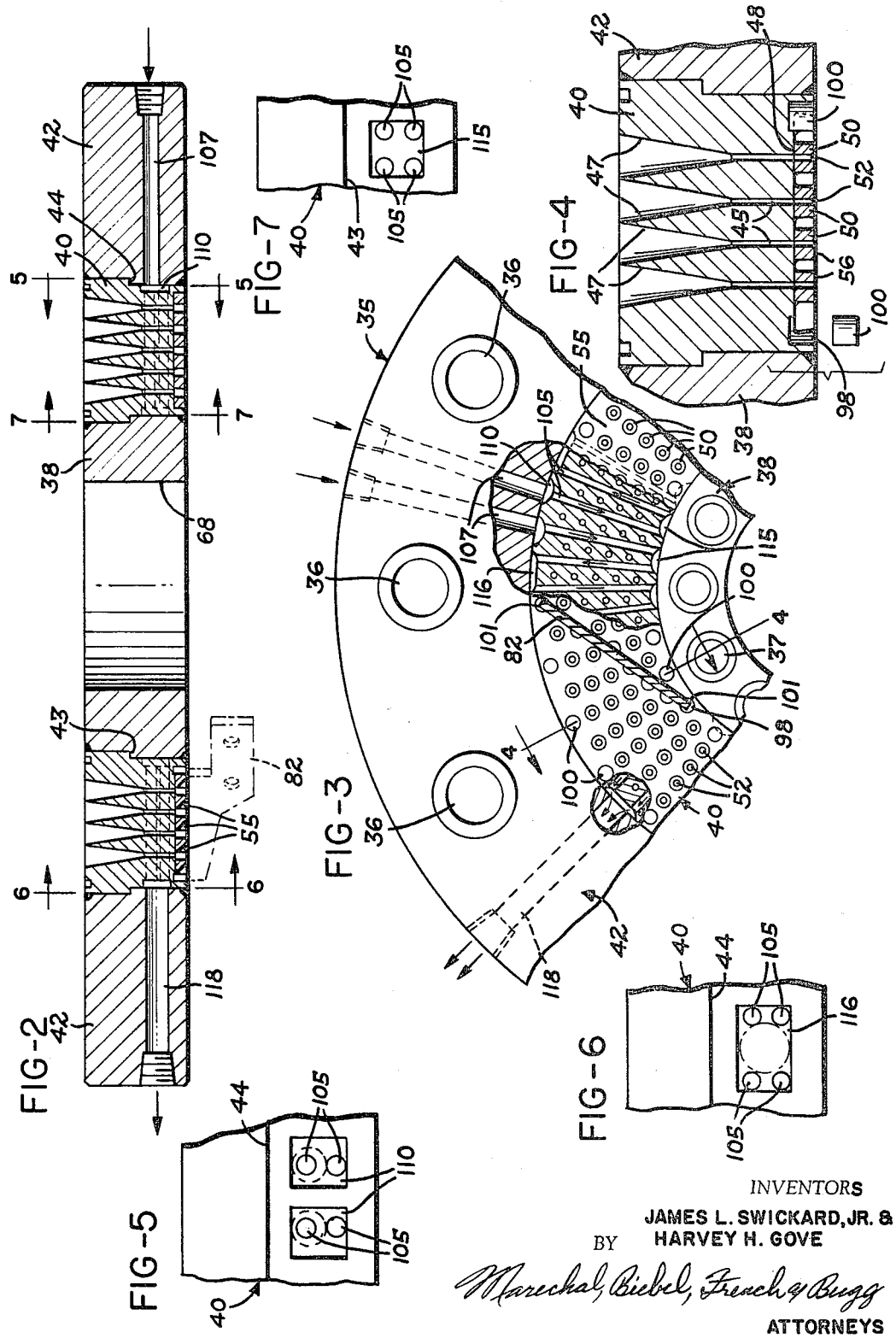

United States Patent Office 3,287,764
Patented Nov. 29, 1966

3,287,764
PLASTIC PELLETIZERS
James L. Swickard, Jr., and Harvey H. Gove, both of Hamilton, Ohio, assignors to The Black Clawson Company, Hamilton, Ohio, a corporation of Ohio
Filed June 1, 1965, Ser. No. 460,116
8 Claims. (Cl. 18—12)

This invention relates to plastic pelletizers, and more particularly, to an improved die plate for a plastic pelletizer.

It has been found desirable to heat the die plate in a plastic pelletizer to assure that the plastic material or polymer which is extruded through orifices formed in the die plate does not cool and solidify before the material is discharged. Also the die is heated when starting up to melt or soften the remaining polymer which hardened in the orifices after a previous shutdown. Commonly, the orifices formed in the die plate are arranged in an annular pattern with the orifices spaced close together so that a maximum number of pellets can be produced by a die plate of predetermined size. For heating the die plate, usually a fluid such as steam, hot oil or other heat transfer fluids is directed through the die plate in close proximity to the orifices so that the fluid effectively heats the surfaces defining the orifices.

A knife member is commonly rotatably mounted adjacent the die plate and is provided with a cutting knife which rotates in contact with the die plate and sweeps the discharge end of the orifices to shear the extruded strings of plastic material into small bits which are solidified into pellets by a flow or spray of cooling fluid such as water. The water also serves to carry the pellets away from the die plate for subsequent drying and packaging. To prevent the fluid employed for cooling the pellets from also cooling the die plate, it has been found desirable to expose only a nozzle portion of each orifice sufficient to define a cutting surface for the knife and then surround these nozzle portions with a suitable insulation. This construction is shown in the copending application of Robert E. Hoffman and H. Paul Koppehele, Serial No. 261,382, filed February 27, 1963, now Patent No. 3,230,582, and assigned to the same assignee as the present invention.

To provide an effective and clean shearing action of the extruded strings of plastic material, the rotary cutting knives are preferably mounted on an inclined angle in relation to the cutting surface defined by the nozzle portions and tangential to the hub supporting the cutting knives. As a result of this position of the cutting knives and of the small diameter of the nozzle portions, it has been found uneconomical in production to control the precise position of the cutting knives to prevent them from extending beyond the inner and outer annular rows of nozzle portions.

Thus after an extended period of use, it has been found that the end portions of the cutting knives which do not contact the cutting surface defined by the nozzle portions will wear substantially less than the center portion of the knife. This uneven wear of the cutting knives has been found to result in a corresponding non-uniform wear of the die plate and eventually prevents a clean shear of the pellets and also causes the knife to form grooves in the insulation material.

It is also desirable to consruct a die plate for a plastic pelletizer so that a heating liquid flows uniformly through the die plate whereby all of the orifices are maintained at a substantially uniform temperature and thus the plastic material extruded through the orifice will be maintained at a uniform temperature and the pellets will be formed of uniform size. Thus it has been found desirable to provide a zig-zag or serpentine-like flow path for the heating liquid around the orifice so that each orifice is uniformly heated and the liquid cannot short circuit or bypass some of the orifices. This serpentine-like arrangement is especially desirable for a liquid heating fluid such as hot oil which has a greater tendency to flow along the path of least resistance than does a gaseous fluid such as steam.

It has also been found that a die plate made up of interfitting annular pieces offers particular advantages, by decreasing the cost of construction and by increasing reliability over other known types of pelletizer die plates. The machining steps for forming the heating passageways to provide a distinct serpentine-like flow can thus be formed in one or more of the die plate sections prior to assembly. Preferably, a center or intermediate section contains a major portion of the heating passageways as well as the passageway return or interconnecting conduits, thereby confining a major portion of the machining of the intermediate section.

Accordingly, it is a primary object of the present invention to provide an improved die plate of simplified construction wherein a high concentration of orifices are heated uniformly by a heating fluid which flows in close proximity to each of the orifices and cannot bypass any section or group of orifices.

It is also an object to provide a die plate as outlined above wherein the heating fluid, preferably a liquid is positively directed through the die within passageways which are connected together to provide a distinct serpentine-like flow path so that the die is heated evenly and uniformly, and the construction is such that substantial internal pressures are withstood without short circuiting the heating flow path should it be necessary to increase fluid pressure to purge or clean the heating passageway.

A further object of the invention is to provide an improved die plate as outlined above, which is constructed in three sections so that the passageways for the heating fluid can be easily formed and connected to provide a distinct serpentine-like flow path for the heating fluid through the die plate.

Still another object of the invention is to provide an improved plastic pelletizer which includes a die plate and a knife member rotatably mounted adjacent the die plate and wherein the die plate is provided with hardened nozzle portions and wear stubs to provide a uniform wear along the knife member and to minimize wear of the die plate so that these components are provided with a long service life.

A more specific object of the invention is to provide an improved die plate for a plastic pelletizer as outlined above, wherein the die plate includes a series of carbide nozzle tips for defining a cutting surface and further includes a series of corresponding carbide wear stubs which cooperate with the carbide nozzle tips to provide a uniform wear along the cutting edge of the rotating knives and thereby provide for precision shearing of the plastic into pellets over an extended period of use.

As another object, the invention provides a die plate construction as outlined above which can be easily inspected and serviced in case a leak of heating fluid should develop since the only sealed joints where leaks could possibly develop are the exposed welds which join the annular die sections.

It is also an object of the invention to provide an improved die plate at outlined above wherein the orifices through which the plastic material is extruded are arranged in closely spaced radial rows with a plurality of axially spaced passageways extending radially between the rows of orifices so that a high capacity of heating fluid can be circulated within the die plate while also providing for a high concentration of orifices.

Other objects and advantages of the invention will be apparent from the following description, the accompanying drawings and the appended claims.

In the drawings:

FIG. 2 is an enlarged axial section view of the die plate shown in FIG. 1;

FIG. 3 is an enlarged fragmentary plan view in part section of the die plate shown in FIG. 2;

FIG. 4 is an enlarged fragmentary section view of a portion of the die plate showing a series of axially extending orifices as seen along the line 4—4 of FIG. 3;

FIG. 5 is a fragmentary radial view of the center section of the die plate as viewed along the line 5—5 of FIG. 2 and showing the inlet to the passageways for the heating fluid;

Figure 1:
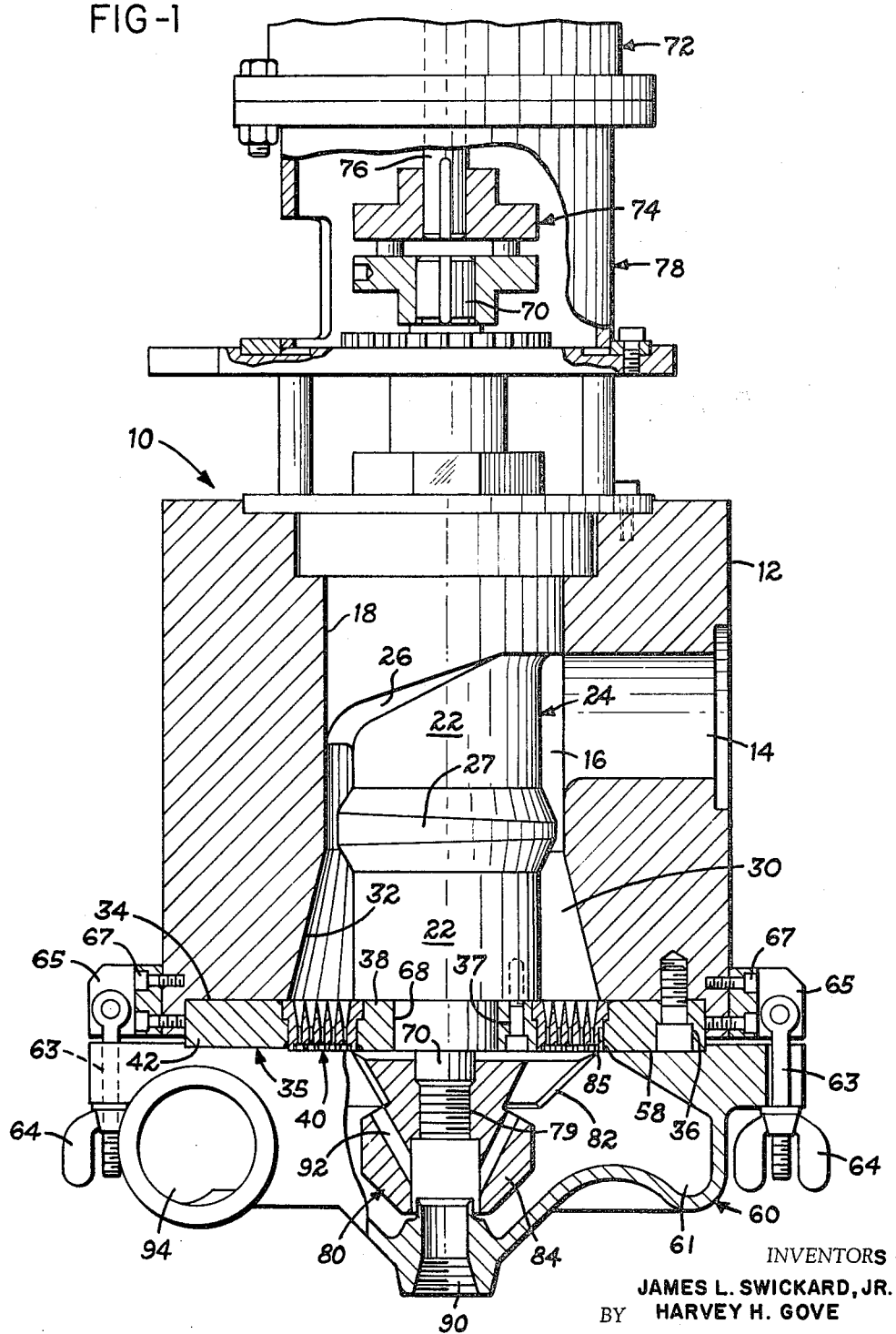
FIG. 1 is an axial section view of a plastic pelletizer including an improved die plate formed in accordance with the invention.

FIG. 6 is a further fragmentary radial view of the die plate center section viewed along the line 6—6 of FIG. 2 and showing a typical outer slot for reversing the flow of heating fluid through the passageways; and FIG. 7 is a still further fragmentary radial view of the die plate center section as viewed along the line 7—7 of FIG. 2 and showing a typical inner slot for reversing the flow of the heating fluid between adjacent passageways.

Referring to the drawings which illustrate a preferred embodiment of the invention, the plastic pelletizer shown in FIG. 1 includes generally a body 10 which is provided with a flat face 12 for mounting the pelletizer on the barrel of a plastic extruder with the aid of an adaptor, or on a mixing valve or other suitable source of molten plastic material. The molten plastic material or polymer is forced into a transverse inlet passageway 14 formed within the body 10 and into an annular chamber 16 defined by a bore 18 formed within the body 10 and the cylindrical outer surface 22 of a stationary mandrel 24 mounted within the bore 18.

Preferably, the mandrel 24 is provided with an inclined annular ledge or surface 26 which directs the plastic material axially within the chamber 16 towards the annular choke portion 27 formed as an integral part of the mandrel 24. The surface 26 and choke portion 27 cooperate to provide a uniform distribution or flow of material around the choke portion. The plastic material then flows into an extrusion chamber 30 which is defined by the cylindrical surface 22 of the mandrel 24 and a fruste-conical surface 32 formed within the body 10.

Formed within the end of the body 10 is a counterbore 34 in which is mounted a circular die plate 35 which is secured to the body 10 by a series of screws extending through the openings 36 and to the mandrel 24 by a series of scriws extending through the openings 37. As shown in FIG. 2, the die plate 35 is formed by welding together three annular sections including an inner section 38, an intermediate or center section 40 and an outer section 42 so that all of the weld joints are exposed for inspection and repair. These sections are provided with corresponding annular shoulders or steps 43 and 44 which simplify precision assembly of the sections and support the center section 40 against pressure exerted by the plastic material.

Formed within the intermediate annular section 40 are a series of relatively small diameter axially extending orifices 45 which are arranged in radial rows spaced around the entire annular section 40 as indicated in FIG. 3. Preferably the orifices 45 are provided with a conical-shaped inlet portion 47 which aid in providing a uniform flow of material into the orifices 45.

As shown in FIG. 4, an annular shallow recess 48 is formed within the intermediate section 40 and a series of cylindrical nozzle tips 50 are mounted within the recess. The nozzle tips are provided with orifices 52 which serve as extensions of the orifices 45. Preferably the nozzle tips 50 are formed from tungsten carbide steel and are secured within the annular recess 48 by a suitable brazing operation. Surrounding the hardened nozzle tips 50 and filling the remainder of the annular recess 48 is a layer of insulation material 55 (FIG. 2) which preferably is formed from a fiberglass filled silicon molding compound which is forced under pressure into the recess 48 after the nozzle tips 50 are in place to provide a thermal barrier to prevent cooling of the die plate by the pellet entraining water.

Mounted on the end surface 58 (FIG. 1) of the outer section 42 of the die plate 35 is a housing 60 which defines a water-tight chamber 61. The housing 60 is secured to the body 10 for quick removal by a series of four swing bolts 63 and wing nuts 64 which are carried by a corresponding series of support blocks 65 mounted on the body 10 by the screws 67.

Formed within the inner section 38 of the die plate 35 is an opening 68 through which extends a shaft 70 which is rotatably supported by suitable bearings (not shown) mounted within the stationary mandrel 24 as shown in the aforementioned application. The shaft 70 is rotated by a motor 72 through a flexible drive coupling 74 which connects the motor shaft 76 to the shaft 70 within the cylindrical housing 78.

Mounted on the opposite end of the shaft 70 by a threaded or spring loaded connection 79 within the housing 60 is a knife member 80 which carries a series of knife blades 82. As shown in FIG. 1, and in greater detail in the aforementioned application, the knife blades 82 are mounted on the hub 84 in an inclined position relative to the cutting surface defined by the end surfaces 56 of the cylindrical nozzle tips 50. Preferably, the blades 82 are mounted tangentially on the hub 84 as mentioned above so that the cutting edge 85 of each blade 82 sweeps the cutting surface with a shearing action causing the plastic strings extruded through the orifices 45 and 52 to be cleanly severed into small bits. It is most desirable that the strings of plastic be sheared cleanly so that there remain no fine tails connecting successive bits. Thus it is highly desirable to have precision contact between the cutting edge 85 of each knife blade and the cutting surface 56 of each nozzle tip 50.

The chamber 61 which is defined by the housing 60 is supplied with a chilling liquid such as water through the inlet 90. The water is directed into the chamber 61 through the passages 92 formed within the hub 84 so that the blades 82 are continuously flushed. The water is employed to cool the bits of plastic material extruded through the orifices 45 and cut by the blades 82 to solidify them to form hardened pellets and to entrain the same for removal through the outlet 94.

As shown in FIG. 3, the individual nozzles are arranged in annular concentric paths and radial rows with the adjacent nozzles in each row being arranged in laterally staggered relation to those in the next nozzle row. In the specific embodiment shown, there are alternate radial rows of four nozzles and five nozzles each, respectively. Therefore, with this arrangement, the radial nozzle rows having only four nozzles are somewhat shorter in length than the adjacent radial rows which have five nozzles. The grouping permits the optimum number of nozzles to be contained within the intermediate section 40, so that a maximum number of pellets can be formed within the available space. However, the arrangement is such that in order for the knife blade 82 to sweep the full annular extent of the intermediate section 40, it is necessary that such blades have a diagonal length which somewhat exceeds the maximum and minimum radial extent of the nozzles, themselves.

Referring to FIGS. 3 and 4, mounted within a series of cylindrical openings 98 formed adjacent the inner and outer annular peripheries of the recess 48 are a series of wear stubs 100. The stubs are preferably positioned at the ends of the shorter rows, and are preferably formed from the same material as the nozzle tips 50. The wear stubs may thus be formed of tungsten carbide as the tips 50 and serve to extend the cutting surface defined by the end surfaces 56 of cylindrical nozzle tips 50 so that the end portions 101 of the knife blades 82 also contact hardened material. In this manner the cutting edge 85 (FIG. 1) of the blades will wear uniformly along the full length of the blades. Thus as the knife blades sweep around the annular cutting surface defined by the nozzle tips 50 and the wear stubs 100, all portions of the cuting edge 85 engage the carbide material. As a result, the knife blades 82 wear evenly and do not form projections which groove the insulation material 55 inserted between the nozzle tips 50.

To provide for a circulation of heating fluid within the intermediate section 40 of the die plate 35 so that the plastic material does not solidify within the orifices 45 and 52, a series of radially extending passageways 105 (FIG. 3) are formed within the intermediate section 40 between the radial rows of orifices 45. As shown in FIG. 5, the passageways 105 are formed in pairs spaced axially apart and with relatively small diameters to provide an adequate heat exchange surface and volume handling capacity, and so that the rows of orifices 45 can be spaced close together as shown in FIG. 3. The mutiple axially spaced passageways 105 provide for a high flow capacity of the heating fluid through the intermediate section 40 which has been found desirable to provide a quick transfer of heat into the die plate.

The heating fluid, which is usually either steam or hot oil, is supplied to the passageways 105 by a plurality of inlets 107 formed radially within the outer section 42 as shown in FIGS. 2 and 3. In order for a single inlet passage 107 to supply a pair of axially spaced passageways 105, the outer periphery of the intermediate annular section 40 is provided with a milled slot 110 which connects the inner end of an inlet passage 107 with the outer ends of a pair of passageways 105 (FIG. 5).

As shown in FIG. 3, the flow of heating fluid through the passageways 105 is directed along a radial serpentine-like flow path, as shown by the arrows. This reversing flow path is provided by a series of milled slots 115 and 116 which are formed around the inner and outer peripheries of the intermediate section 40 so that the corresponding ends of adjacent pairs of passageways 105 are interconnected, as shown in FIGS. 3, 6 and 7.

Preferably the die plate 35 is provided with six inlet passages 107 and three radially extending outlet passages 118 within the outer section 42 so that the die plate is divided into six sectors and the heating fluid flows separately along a serpentine-like flow path through each sector or 60°. Thus as shown in FIG. 3, a separate inlet passage 107 is provided for each sector of the die plate 35 and one outlet passage 118 serves two adjacent sectors. By this construction, the heating fluid flows into the die plate through inlet passages spaced 120° apart and is discharged through outlet passages also spaced 120° apart. As a result, each of the orifices 45 are heated to substantially the same temperature.

It can be seen from the drawings and the above description that a die plate constructed in accordance with the present invention provides several desirable features and advantages. By forming the die plate in three annular sections with the intermediate section 40 provided with the radial flow passageways 105 and the outer section 42 provided with the inlet and outlet passages 107 and 118 respectively, the construction of the heated die plate has been substantially simplified.

The slots 110, 115 and 116, direct the heating fluid through the die plate along a uniform serpentine-like flow path so that all of the orifices 45 are heated. In addition, by dividing the die plate into a plurality of six sectors with heating fluid circulated separately through each sector, all of the orifices 45 can be maintained at substantially a uniform temperature. In the preferred embodiment, the heating passageways 105 and the slots 110, 115 and 116 are confined to the central or intermediate die section 40, and thus may be conveniently drilled into this section prior to assembly and welding with the inner section 38 and the outer section 42. In this manner, a leak-proof heating die plate is assured.

The arrangement of the die plate is such that a maximum amount of heat can be applied to the die plate and is uniformly distributed to each of the nozzles. This is of particular advantage in pelletizing certain polymers which are critical to temperature, and assures that pellets of uniform size are at each of the nozzles. Sufficient heat can be applied to the die plate by this arrangement to permit cold start-ups following shutdown even with water on the face surface of the die plate.

The construction of the die plate is such that leaks can easily be detected since there is no fluid seal which is covered by insulation. Also, leaks if they should occur, can be repaired without the removal of any insulation, and any leakage will be confined to one of the four surface welds joining the intermediate section to the inner and outer sections.

Should there become any tendency for the passageways 105 to become blocked, such as with burnt oil or the like, a purging fluid under a sufficiently high pressure can be applied directly to the inlets 107, or reverse flushed through the outlet 118, as desired, to clean out the heating passageways. The arrangement of the parts is such that high fluid pressure may be used without risking damage to the die plate, due to the absence of brazed connections in the die plate heating system.

Another feature is provided by forming the radially extending passageways 105 in pairs between adjacent rows of orifices 45 to provide for a high flow capacity for heating fluid while obtaining a high concentration of orifices 45 to provide for a maximum production of pellets. Also, by combining the carbide wear stubs 100 with the carbide nozzle tips 50, the knife blades 82 and die plate are each provided with a substantially longer service life which has been found to reduce the operating costs for the plastic pelletizer by a significant margin.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An improved die plate for a plastic pelletizer, comprising an annular intermediate section having means defining a plurality of axially extending orifices through which the plastic material is extruded, said intermediate section further including a series of generally radially extending passageways spaced between said orifices for conducting heating fluid through said intermediate section in close proximity to said orifices, an inner section spaced within said intermediate section and connected thereto for closing the inner ends of said radially extending passageways, an annular outer section surrounding said intermediate section and connected thereto for closing the outer ends of said radially extending passageways, said outer section having means defining a series of inlet and outlet passages for receiving and discharging heating fluid, and means for connecting said ends of said passageways extending radially through said intermediate section to said inlet and outlet passages for providing a generally uniform flow of heating fluid through said intermediate section.

2. A die plate as defined in claim 1 wherein said axially extending orifices are arranged in radial rows around said annular intermediate section, and adjacent said rows of orifices are separated by a plurality of axially spaced radially extending passageways.

3. A die plate as defined in claim 1 wherein said intermediate section is joined to said inner and outer sections by fused metal welds at the annular junctions therebetween forming four annular sealed joints which are exposed for convenient inspection and servicing.

4. An improved die plate for a plastic pelletizer, comprising an annular intermediate section having means defining a plurality of axially extending orifices through which the plastic material is extruded, said intermediate section further having a series of generally radially extending passageways spaced between said orifices for conducting heating fluid through said intermediate section in close proximity to said orifices, an inner section spaced within said intermediate section and connected thereto for closing the inner ends of said radially extending passageways, an annular outer section surrounding said intermediate section and connected thereto for closing the outer ends of said radially extending passageways, said outer section having means defining a plurality of radially extending passages in communication with outer ends of said radial passageways within said intermediate section to define an inlet and an outlet for the circulation of heating fluid through said intermediate section, and means defining a plurality of slots for connecting corresponding inner and outer ends of adjacent said passageways extending radially through said intermediate section to provide a radial serpentine-like flow path of the heating fluid through said intermediate section from said inlet to said outlet in said outer section.

5. A die plate as defined in claim 4 wherein said intermediate section includes said means defining said slots around the inner and outer peripheries of said section for alternately connecting the inner and outer ends of adjacent said radially extending passageways to form said radial serpentine-like flow path for fluid through said section.

6. A die plate as defined in claim 4 wherein said intermediate section is divided into a plurality of sectors with corresponding inlet and outlet passages formed in said outer section so that fluid is supplied, circulated and discharged from said intermediate section through a plurality of separate sectors.

7. An improved die plate for a plastic pelletizer including knife means rotatably mounted adjacent said die plate, comprising an annular intermediate section having means defining a plurality of axially extending orifices through which the plastic material is extruded, a corresponding plurality of tubular nozzle tips forming the discharge ends of said orifices and having hardened end surfaces for cooperatively defining a hardened cutting surface, said intermediate section further including a series of generally radially extending passageways spaced between said orifices for conducting heating fluid through said intermediate section in close proximity to said orifices, a series of wear stubs mounted adjacent the inner and outer peripheries of said intermediate section and having a surface substantially as hard as said cutting surface defined by said nozzle members, insulation means inserted between said nozzle members to minimize heat transfer from said nozzle members, an inner section spaced within said intermediate section and connected thereto for closing the inner ends of said radially extending passageways, an annular outer section surrounding said intermediate section and connected thereto for closing the outer ends of said radially extending passageways, said outer section having means defining a series of radially extending inlet and outlet passages for receiving and discharging the heating fluid, and means for connecting said ends of said passageways extending radially through said intermediate section to said inlet and outlet passages for providing a generally uniform flow of heating fluid through said intermediate section to maintain said orifices at a substantially uniform temperature.

8. An improved die plate for a plastic pelletizer including knife means rotatably mounted adjacent said die plate, comprising an annular intermediate section having means defining a plurality of axially extending orifices arranged in radial rows around an annular pattern and through which the plastic material is extruded, means defining an annular recess formed within the discharge face of said section, a plurality of tubular nozzle tips mounted within said recess and forming the discharge ends of said orifices, said nozzle tips each having a corresponding hardened end surface for cooperatively defining a hardened cutting surface, said intermediate section further having a series of generally radially extending passageways spaced between said rows of orifices for conducting heating fluid through said intermediate section in close proximity to said orifices, a series of wear stubs mounted within said intermediate section adjacent the inner and outer peripheries of said annular recess and having a surface substantially as hard as said cutting surface defined by said nozzle members, insulation means inserted between said nozzle members and said wear stubs to minimize heat transfer from said nozzle members, an inner section spaced within said intermediate section and connected thereto for closing the inner ends of said radially extending passageways, an annular outer section surrounding said intermediate section and connected thereto for closing the outer ends of said radially extending passageways, said outer section having means defining a series of radially extending inlet and outlet passages in communication with a corresponding series of outer ends of said passageways for providing a flow of heating fluid to said passageways, and means for alternately connecting inner and outer ends of adjacent said passageways extending radially through said intermediate section for providing a serpentine-like flow of heating fluid through said intermediate section to maintain said orifices at a substantially uniform temperature.

References Cited by the Examiner

UNITED STATES PATENTS

| 2,391,050 | 12/1945 | Horn. | |
|---|---|---|---|
| 2,862,243 | 12/1958 | Farr et al. | |
| 2,879,676 | 3/1959 | Burkhardt et al. | 18—8 X |
| 3,230,582 | 1/1966 | Hoffman et al. | 18—12 |

FOREIGN PATENTS

| 584,767 | 10/1959 | Canada. |
|---|---|---|

WILLIAM J. STEPHENSON, *Primary Examiner.*